Sept. 21, 1926.
W. R. GREEN
AUXILIARY TIRE CARRIER
Filed Dec. 26, 1924
1,600,630
2 Sheets-Sheet 1
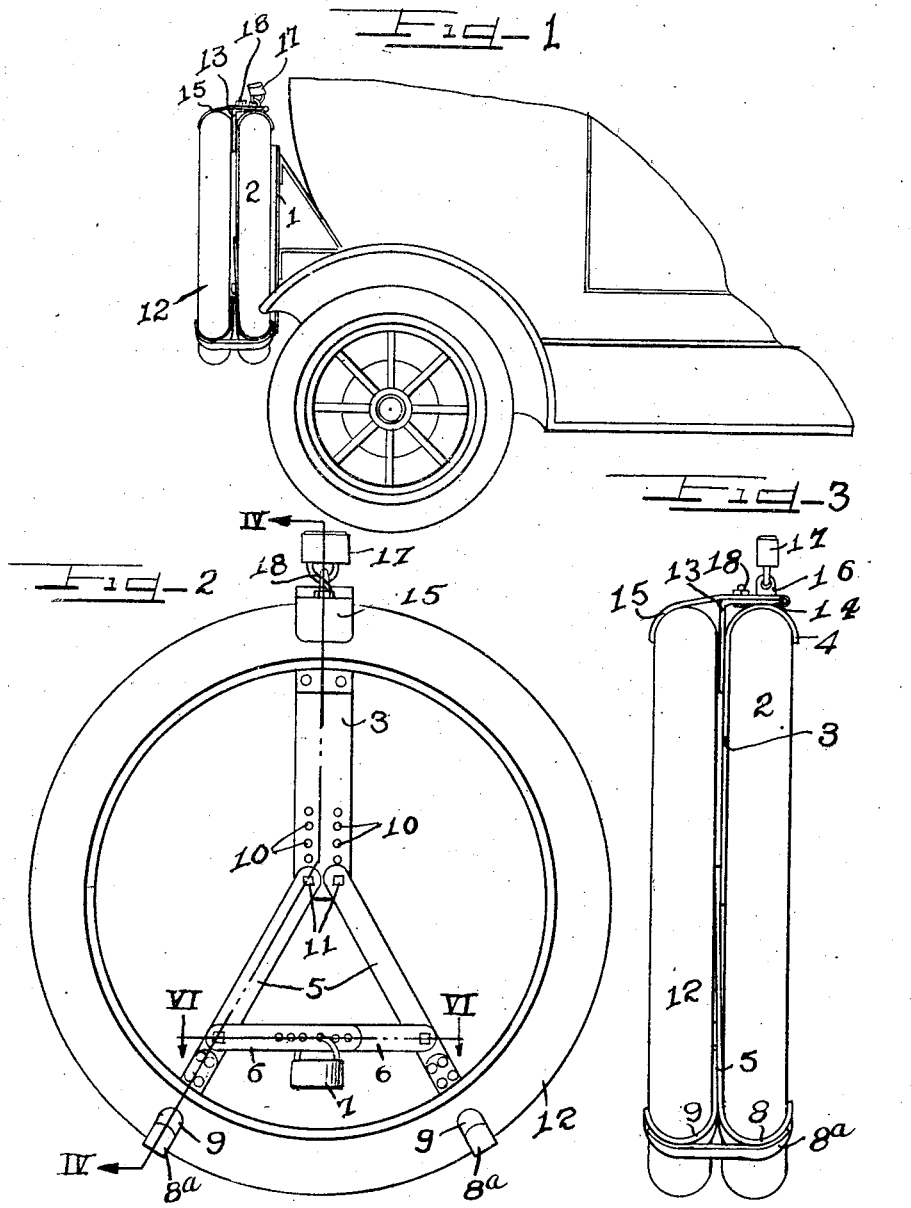
Inventor
Walter R. Green
by Charles Hill
Attys.

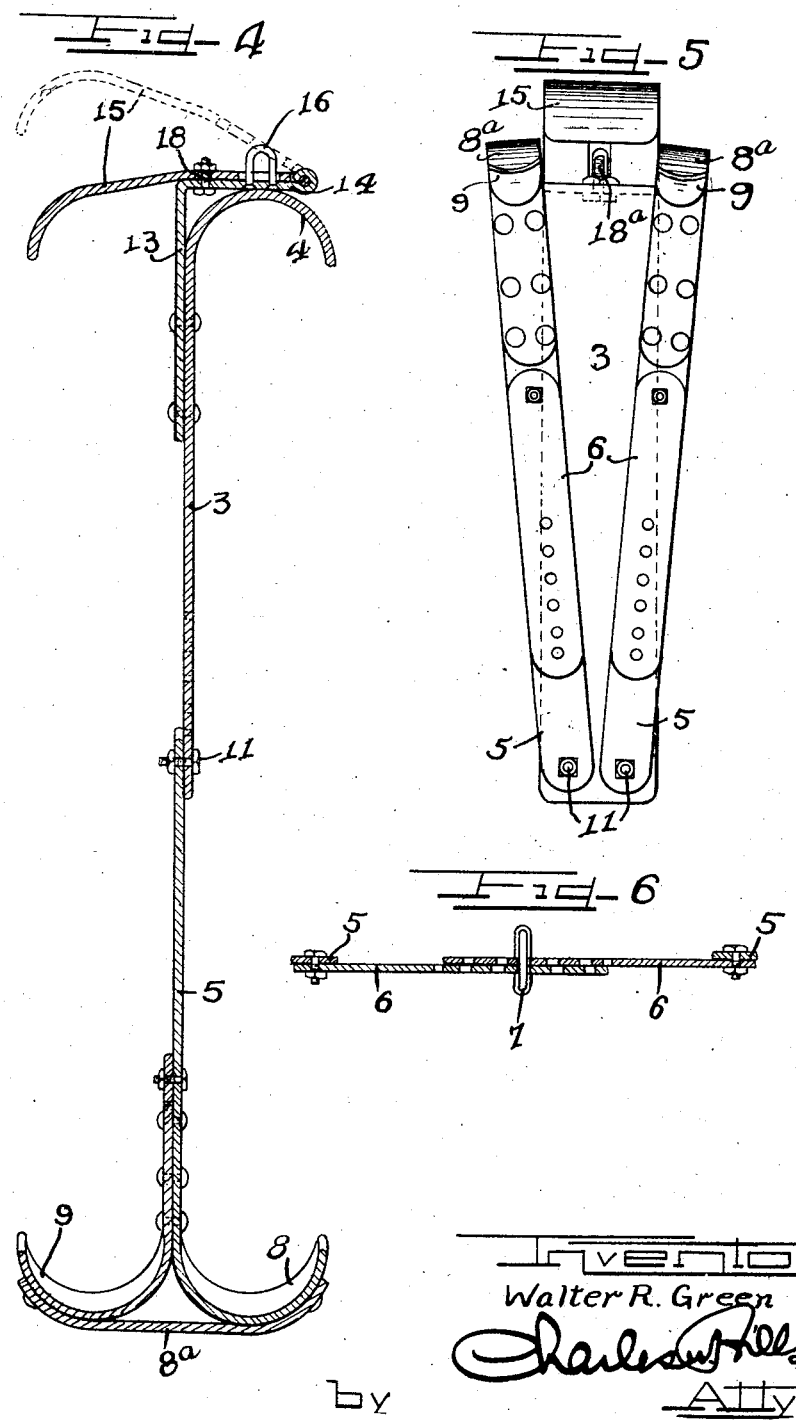

Patented Sept. 21, 1926.

1,600,630

UNITED STATES PATENT OFFICE.

WALTER R. GREEN, OF CHICAGO, ILLINOIS.

AUXILIARY TIRE CARRIER.

Application filed December 26, 1924. Serial No. 758,097.

This invention relates to an auxiliary tire carrier adapted to be suspended from a tire or casing on a standard tire carrier.

The invention seeks to provide an auxiliary carrier which may be quickly and easily applied to a tire carrier, that is effectively retained thereon, that allows the extra tire to be readily removed, that is adjustable for suspension from different sized tires and for supporting or carrying different sized tires.

The invention comprises the novel structure and combination of parts hereinafter described and more particularly pointed out and defined in the appended claim.

In the accompanying drawings which illustrate a preferred embodiment of this invention and in which similar reference numerals refer to similar features in the different views:—

Figure 1 is a fragmentary elevational view of the rear portion of an automobile having the usual tire carrier with my auxiliary tire carrier applied thereto.

Figure 2 is an enlarged elevational view of my auxiliary tire carrier with a tire supported thereon.

Figure 3 is an enlarged edge elevational view of the auxiliary tire carrier attached to a spare tire.

Figure 4 is an enlarged sectional view upon the line IV—IV of Figure 2.

Figure 5 is an enlarged elevational view of the auxiliary carrier in folded position.

Figure 6 is an enlarged sectional view upon the line VI—VI of Figure 2.

As shown on the drawings:

Referring to the drawings it will be noted that I have illustrated a cylindrical tire carrier 1 attached to the rear structure of a vehicle upon which a tire is supported. It should however be understood that the word tire is used to include the pneumatic tube mounted upon a rim as well as the tube per se. The carrier 1 is usually a part of the original equipment of the vehicle, and in cases where it is desired to carry more than one spare tire, my auxiliary tire carrier finds ready application.

The auxiliary carrier comprises an upper member 3 provided with an upper terminal hook 4 adapted to engage over the top of the tire on the regular carrier 1. A pair of arms 5 are pivoted upon the lower end of the member 3 and are adapted to be swung together or apart for a purpose that will later appear. A pair of links 6 are pivoted at their outer ends to the respective arms 5. The inner portions of these links are perforated and overlap. When a pair of apertures in such links are in registry, the hasp of a padlock 7 may be extended therethrough for locking the arms 5 against swinging movement. The lower end of each arm 5 terminates in a hook or arcuate portion 8 adapted for engaging over the lower part of the first spare tire 2 and an arcuate shoe 9 preferably attached thereto for engaging and retaining the auxiliary tire. A bridging strip 8ª may connect said shoes.

The upper member 3 is provided at its lower end with two series of apertures 10 for receiving the pivotal supports for the arms 5. These pivotal supports consist in the present instance of bolts 11 which permit ready adjustment of the arms 5 with respect to the upper member 3 for supporting different sized tires. The lowermost apertures of the series 10 are above the center of the tire 12 supported by the auxiliary carrier. Consequently the pivotal points of the arms 5 will always be eccentric with respect to the supported tire. If a smaller tire is supported, the arms 5 will of course be supported in higher apertures. The arms 5 should of course be shorter than the distance between the lowermost apertures 10 and the lowermost point of the largest tire to be supported so that the arms 5 may engage the tire at sufficiently spaced points to secure a proper clamping action, and a proper supporting position.

An angle member 13 is secured upon the upper member 3 of the carrier with the outstanding flange 14 thereof superposed over the shoe or hook 4. The end of the flange 14 is curled up to provide a hinge bearing to which a shoe 15 is pivoted that forms the upper shoe of the auxiliary carrier. A hasp or staple 16 rises from the flange 14 for entering a slot in the shoe 15. A padlock 17 may be fastened upon the staple 16 for locking the shoe 15 against pivotal movement. Forward of the hasp 16 a bolt 18 extends through the angle 13 and shoe 15.

The auxiliary carrier may be readily folded into compact form. By removing the padlock 7 the link 6 may be swung to superposed relation with the arms 5 which may in turn be swung to superposed relation with respect to this upper member 3 as shown in Figure 5.

In the use of this auxiliary the shoe 14 is placed upon the upper portion of the tire on the regular carrier. The arms 5, assuming that the same have been properly adjusted with respect to the member 3, may be swung upwardly so that the shoes or clamps 8 may engage over the tire on such regular carrier. Then the arms 5 may be swung downwardly so that the shoes 8 will tightly engage such tire, whereby the auxiliary carrier becomes firmly clamped upon the said tire. The links 6 may then be locked together by the padlock 7. Assuming that the upper shoe 15 is in unlocked position, it may be elevated as shown in dotted lines in Figure 4 to allow a tire to be inserted within the auxiliary carrier. The shoe 15 may then be lowered and the bolt 18 and the padlock 18ª applied for locking the tire in such auxiliary carrier. To remove the tire from the auxiliary carrier, it is only necessary to unfasten the upper shoe 15 by removing the bolt 18 and padlock as is obvious.

It will be appreciated that the adjustment of the arms 5 of the carrier adapts the auxiliary carrier for use in connection with various sized tires. Further the eccentricity of the supporting pivots of the arms 5 provides a clamping effect of the shoes 8 upon the tire of the regular carrier 1, and the use of the adjustable links 6 retains such shoes in their clamping relation.

I am aware that many changes may be made, and numerous details of construction may be varied through a wide range without departing from the principles of this invention, and I therefore do not purpose limiting the patent granted hereon, otherwise than necessitated by the prior art.

I claim as my invention:—

An auxiliary tire carrier, comprising an upper member having a curved end for forming a tire shoe, an angle device secured to said member, a shoe pivoted upon said angle device, locking means for said pivoted shoe, swingable arms adjustably connected to the lower end of said member, a pair of oppositely directed shoes upon the lower end of each arm, and adjustable links for connecting said arms, and a lock for locking said links together.

In testimony whereof I have hereunto subscribed my name.

WALTER R. GREEN.